(12) United States Patent
Hicks

(10) Patent No.: US 6,435,235 B1
(45) Date of Patent: Aug. 20, 2002

(54) MOUNTING FOR TREE HARVESTER HEAD

(75) Inventor: Keith B. Hicks, Laval (CA)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/694,953

(22) Filed: Oct. 24, 2000

(51) Int. Cl.$^7$ .............................................. A01G 23/08
(52) U.S. Cl. ..................... 144/34.1; 144/336
(58) Field of Search .................. 144/4.1, 24.13, 144/34.1, 335, 336, 343

(56) References Cited

U.S. PATENT DOCUMENTS

| | | | |
|---|---|---|---|
| 4,989,652 A | * | 2/1991 | Hansson ................ 144/34.1 |
| 5,101,872 A | * | 4/1992 | Scheuren ................ 144/336 |
| 5,553,993 A | | 9/1996 | Gilbert |
| 5,590,699 A | | 1/1997 | Gilbert |
| 5,595,225 A | | 1/1997 | Gilbert |
| 5,727,610 A | | 3/1998 | Isley |
| 5,908,060 A | * | 6/1999 | Fargeot ................ 144/336 |
| 6,003,570 A | * | 12/1999 | Falatok et al. ........... 144/4.1 |
| 6,085,811 A | * | 7/2000 | Wiemeri et al. .......... 144/4.1 |
| 6,123,124 A | * | 9/2000 | Naud .................. 114/34.1 |

* cited by examiner

*Primary Examiner*—Ed Tolan
(74) *Attorney, Agent, or Firm*—Nexsen Pruet Jacobs & Pollard, LLP; Liza J. Meyers

(57) ABSTRACT

A tree harvester head structure is connected to a mounting structure on a mobile tree harvester by a compact coupling which provides lateral pivotal movement of the harvester head structure. An antifriction bearing and a fluid powered rotary actuator have a concentric relationship and are in substantial radial alignment, thus creating a compact design and avoiding additional side loading of the bearing. A brake prevents rotational movement of the tree harvester head structure except when the rotary actuator is operated.

20 Claims, 4 Drawing Sheets

MOUNTING FOR TREE HARVESTER HEAD

TECHNICAL FIELD

This invention relates generally to a tree harvesting machine and more particularly to the mounting of a felling or processing head on a free end of a boom in a manner permitting lateral swinging movement of the felling head.

BACKGROUND ART

Tree harvesting machines such as felling bunchers and felling processors typically have tree harvester heads pivotally mounted on the free end of the boom for enough lateral swinging movement to permit a cut tree to be bunched or laid upon the ground for processing. Various power operated mechanism have heretofore been used or suggested for pivoting the tree harvester heads, including ring gears driven by pinions rotated by hydraulic motors, a pinion driven by a chain, a pinion driven by a rack gear, a planetary gear drive and linear hydraulic actuators. For instance, U.S. Pat. No. 5,727,610 issued Mar. 17, 1998 to R. E. Isley for a Combined Tree Feller and Processor discloses a tree harvester head pivoted by operation of one or more hydraulically driven pinion gears meshing with a ring gear. The gearing of this and other tree harvester constructions is exposed to debris encountered in tree harvesting operations. Some tree harvesters have employed an exposed chain and sprocket arrangement which is subject to damage and excessive wear. Prior designs of rotating mechanisms for tree harvester heads have added an excessive amount of weight to the tree harvester. Excess weight results in additional cost of materials, reduction in payload capacity and increased power requirement for the prime mover.

The present invention is directed to overcoming one or more of the problems as set forth above.

DISCLOSURE OF THE INVENTION

In one aspect of the present invention, a tree harvester head structure is pivotally supported on a mounting structure by a coupling which includes a rotary actuator and a bearing capable of carrying both axial and radial load. The rotary actuator is disposed at one of the radially inner and radially outer sides of the bearing and includes an annular housing component with an annular groove and an annular reaction component disposed within the groove. A vane is secured to the housing component in damming relation to the groove and a vane is secured to the reaction component in circumferentially spaced relation to the vane on the housing component. This positioning of the vanes divides the groove into two pressure chambers. The circumferential thickness of the vanes is sufficiently small to permit 300 degrees of relative rotation between the housing component and the reaction component; which translates to 300 degrees of lateral pivoting movement of the tree harvesting head. A spring applied and fluid pressure released brake between the mounting structure and the harvester head structure prevents lateral pivoting of the harvester head structure except when the rotary actuator is operated.

BEST MODE FOR CARRYING OUT THE INVENTION

Figure 1:
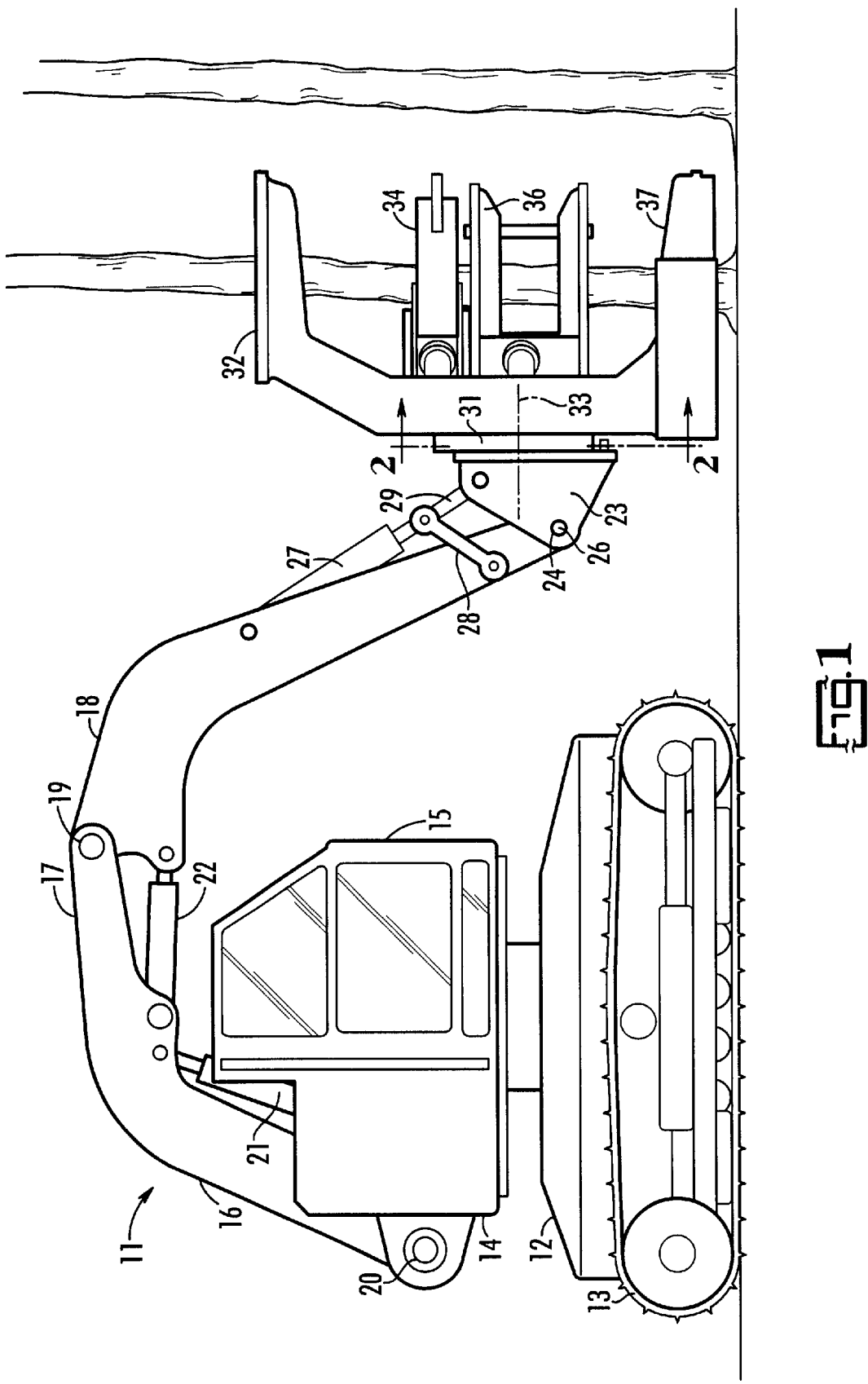
FIG. 1 is a side view of a tree harvester with a tree harvester head.

The tree harvester 11 illustrated in FIG. 1 includes a track machine 12 with an endless track undercarriage 13 and a superstructure 14 which includes an operator's station 15. An articulated boom 16 includes a rear section 17 and front section 18 interconnected by a pivot pin 19. The rear section 17 is pivotally connected to the superstructure 14 for vertical swinging movement by a pivot pin 20. The rear section 17 of the boom 16 is raised and lowered by a hydraulic actuator 21 between the rear section 17 and the superstructure 14 and the front section 18 of the boom 16 is pivoted relative to the rear section 17 by a double acting hydraulic actuator 22 positioned therebetween.

A mounting structure 23 has its lower end pivotally connected to the lower end of the boom section 18 by a pivot pin 24 for swinging movement about a transverse pivot axis 26. The mounting structure 23 is pivoted about the axis 26 by a hydraulic actuator 27. A cylinder end of the actuator 27 is pivotally connected to the front section 18 of the boom 17 and a rod end of the hydraulic actuator 27 is pivotally connected to the upper end of a tilt lever 28 and to the rear end of a tilt link 29. The lower end of the tilt lever 28 is pivotally connected to the boom section 18 and the forward end of the tilt link 29 is pivotally connected to the upper end of the mounting structure 23.

A coupling 31 is provided to pivotally support a tree harvester head structure 32, in the form of a felling head, for pivotal movement about a bearing axis 33 lying in a vertical plane at right angles to the axis 26. The tree harvester head structure 32 includes a pair of fluid power operated tree grabbing arms 34, 36 and a saw 37 for cutting the trunk of a tree.

Figure 3:
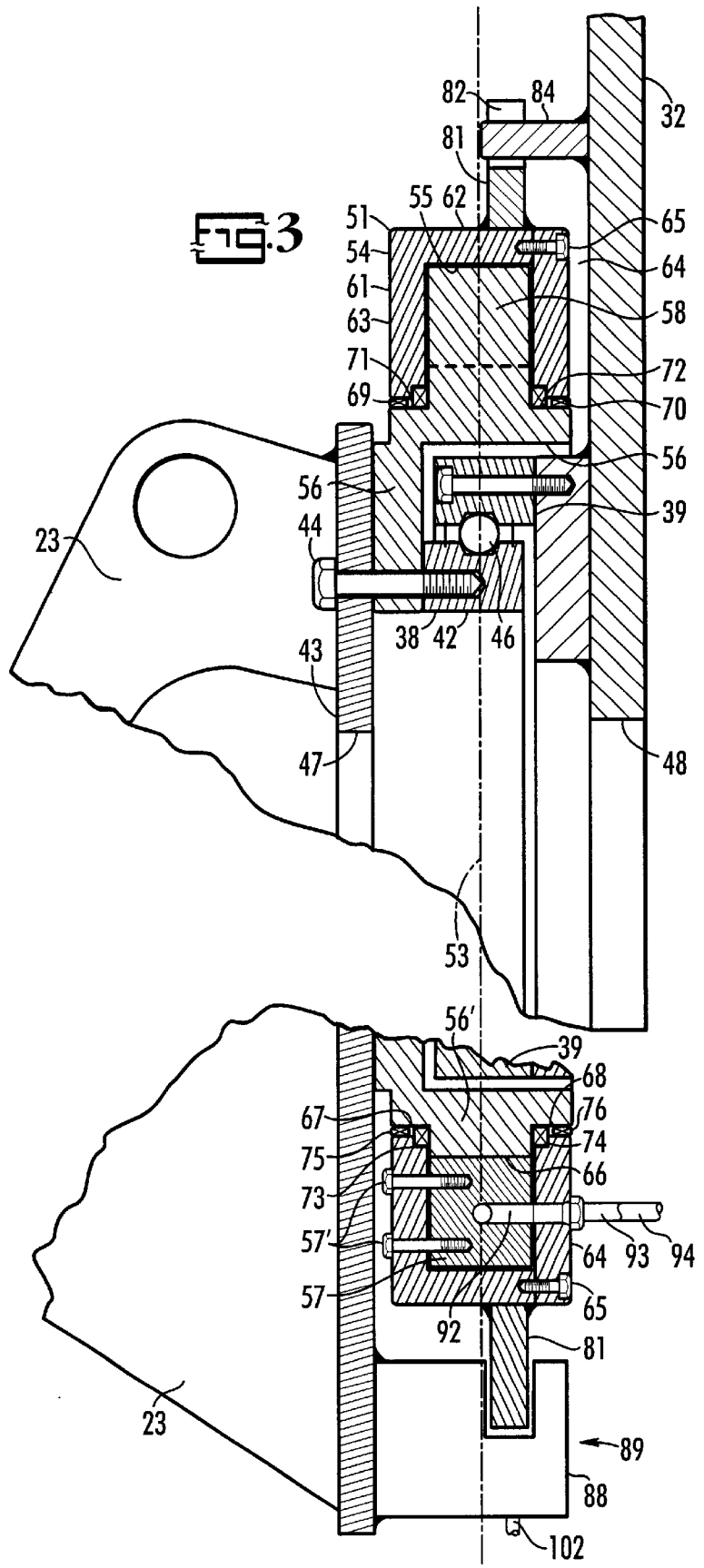
FIG. 3 is a section taken on the line 3—3 in FIG. 2 with parts broken away for illustration purposes.

Referring to FIG. 3, the coupling (31) includes a sealed anti-friction bearing 38 having a radially outer member or race 39 rigidly secured to the tree harvester head structure 32 by a plurality of cap screws 41. A radially inner member or race 42 of the bearing 38 is rigidly secured to a mounting plate 43 of the mounting structure 23 by a plurality of cap screws 44. The bearing 38 also includes a plurality of anti-friction bodies 46 in the form of solid spheres or balls in radial and axial load bearing engagement with the races 39, 42. A pair of large diameter openings 47, 48 are formed, respectively, in the mounting plate 43 of the mounting structure 23 and the tree harvester head structure 32 in substantial alignment with the bearing axis 33. The openings 47, 48 and the inner diameter of the bearing 38 are relatively large and form a passageway for fluid hoses, not shown, extending to the felling head. The coupling 31 also includes an annular fluid powered rotary actuator 51 in radially outer relation to and concentric with the bearing 38.

Figure 2:
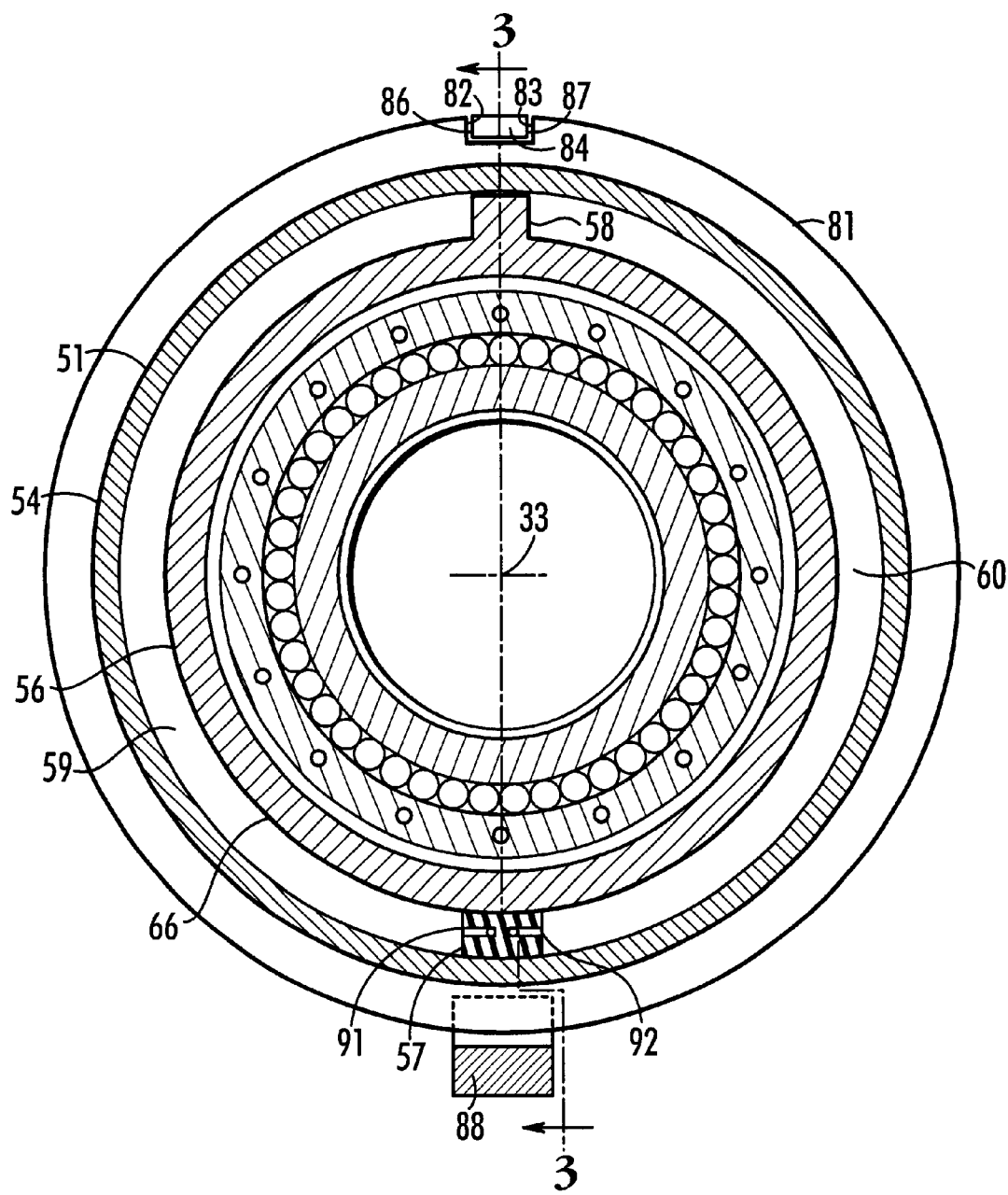
FIG. 2 is a section taken on the line 2—2 in FIG. 1.

Referring also to FIG. 2, the fluid powered actuator 51 is substantially co-planar with a central plane 53 of the bearing 38. The rotary actuator 51 includes an annular housing component 54 having a groove 55 and an annular reaction component 56 rotatably mounted in the groove 55. A radially inward extending vane 57 is secured to the housing component 54 by cap screws 57' and is in damming relation to the groove 55. A radially outward extending vane 58 is formed on the reaction component 56 which also serves as a dam in the groove 55. The vanes 57, 58 divide the groove 55 into a pair of sealed pressure chambers 59, 60. The vanes 57, 58 are circumferentially dimensioned to permit at least 300 degrees of relative rotation between the housing component 54 and the reactor component 56.

The annular housing component 54 includes a first segment 61 having a cylindrical shaped outer wall 62 and a radially inward extending side wall 63.

A second segment in the form of a disk shaped side wall 64 is parallel to the side wall 63 and is secured to the first segment 61 by a plurality of cap screws 65. The annular reaction component 56 includes a central enlarged diameter portion 56' forming a radially inner wall 66 of the pressure chambers 59, 60 and also includes a pair of reduced diameter axially extending shoulders 67, 68. The side walls 63, 64 of the housing component 54 present a pair of radially inward facing equal diameter concentric cylindrical bearing surfaces 69, 70, in radially confronting relation to a pair of radially outward facing equal diameter concentric cylindrical bearing surfaces 71, 72 formed, respectfully, on the shoulders 67, 68 of the reaction component 56 of the rotary actuator 51. A pair of combined side thrust and radial thrust bearings 73, 74 are placed, respectively, between the bearing surfaces 69, 71 and 70, 72. A pair of annular seals 75, 76 are placed, respectively, between the axially outer portions of the bearing surfaces 69, 71 and the bearing surfaces 70, 72.

A brake disc 81, secured by welding to the radially outer extremity of the housing component 54 of the rotary actuator 51, includes a slot presenting a pair of circumferentially spaced abutment surfaces 82, 83. An abutment 84, secured by welding, to the tree harvester head structure 32 extends into the slot in the brake disc 81 and includes a pair of abutment surfaces 86, 87 in circumferentially confronting relation to the abutment surfaces 82, 83 on the brake disc 81. A spring applied and fluid pressure released brake caliper 88 is secured to the mounting structure 23 in cooperative relation to the brake disc 81. The brake disc 81 and the caliper 88 constitute a spring applied and fluid pressure released brake 89 for preventing rotation of the tree harvester head structure 32 relative to the mounting structure 23.

Figure 4:
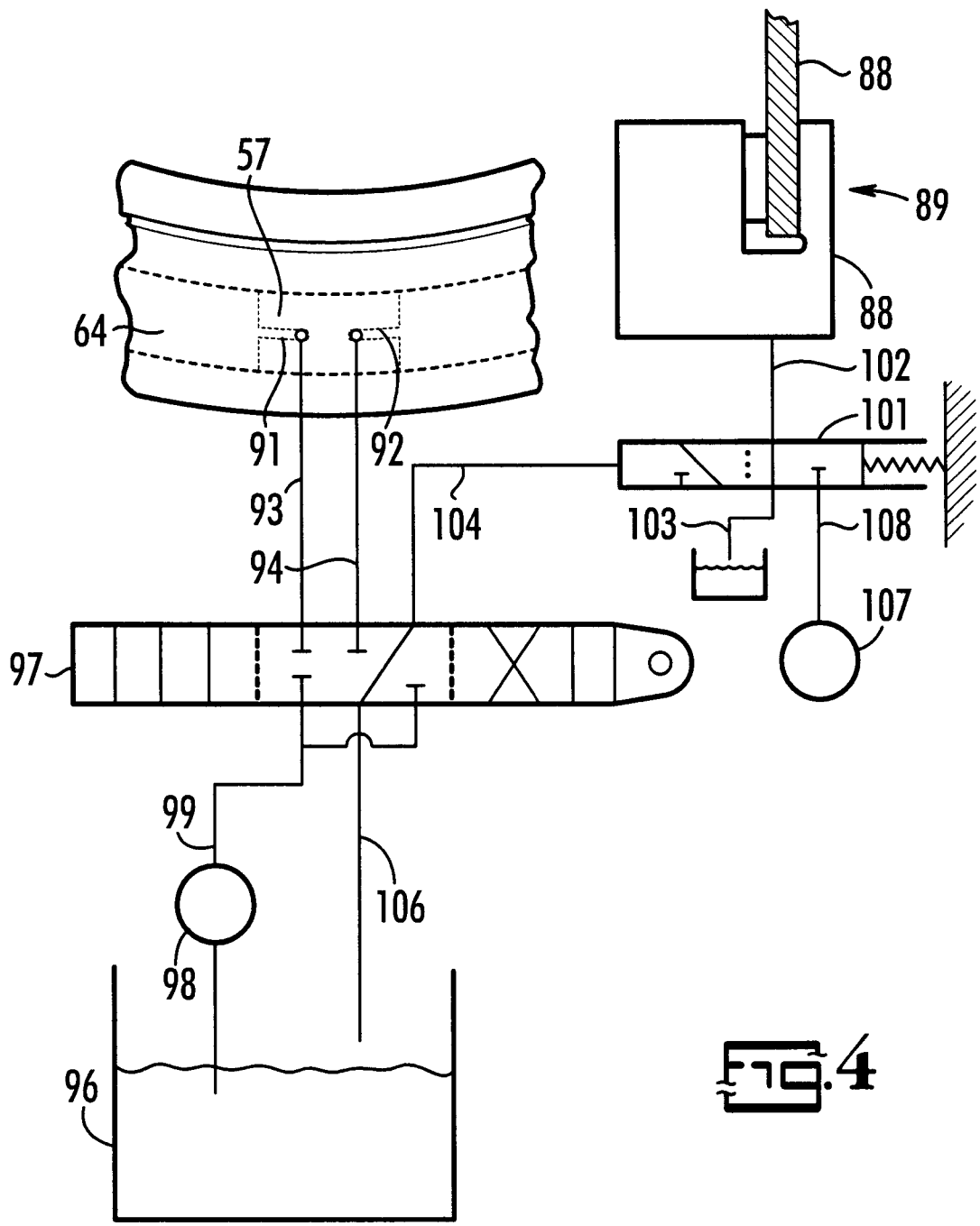
FIG. 4 is a schematic view of a fluid control system for the rotary actuator and the brake.

Referring also to FIG. 4, pressure fluid is selectively supplied to the pressure chambers 59, 60 of the rotary actuator 51 by way of fluid passageways 91, 92 formed in the vane 57 and the side wall 64. The fluid passageways 91, 92 are connected, respectively, to a pair of delivery conduits 93, 94. A fluid control system for the rotary actuator 51 and the brake 89 includes a fluid reservoir 96, a manually operable valve 97 connected to the delivery conduits 93, 94 and a pump 98 connected in fluid receiving relation to the fluid reservoir 96 and in fluid delivery relation to the manually operable valve 97 via a pressure conduit 99. The fluid control system also includes a pilot valve 101 for controlling release of the brake 89. As illustrated in FIG. 4, the pilot valve 101 is in a fluid dumping position of adjustment in which a delivery conduit 102 interconnecting the brake caliper 88 and the pilot valve 101 is connected to a return to reservoir conduit 103 and a pilot valve actuation conduit 104 extending between the pilot valve 101 and the manually operable valve 97 is connected to a return to reservoir conduit 106. When the manually operable valve 97 is shifted either to the left or to the right as viewed in FIG. 4, pressure fluid is delivered to the pilot valve actuation conduit 104 causing the pilot valve 101 to shift to the right to a brake release position in which pressure fluid from a source of fluid pressure 107 is connected to the brake caliper 88 by way of a supply conduit 108, the pilot valve 101 and the delivery conduit 102.

Industrial Applicability

The present invention has advantageous use in tree harvesting machinery, particularly in mounting a tree felling head, or other tree processing heads, to a boom of a self propelled prime mover. During a tree harvesting operation, the tree felling head is pivoted from an upright position, in which it cuts the trunk of the tree, to either lateral side in order to lay the severed tree on the ground or bunch it with other harvested trees. The coupling 31 of this invention provides a compact assembly of a bearing 38 and a rotary actuator 51 which have very few parts exposed to damage by the debris encountered in tree harvesting operations.

In the illustrated preferred embodiment of the invention, the coupling 31 uses one large diameter ball bearing 38 to carry the radial and axial load imposed on it by the tree harvester head structure 32. The large interior diameter of the bearing 38 provides a convenient passageway for control lines, such as fluid hoses, passing to the saw 37 and the grabbing arms 34, 36. The annular fluid powered rotary actuator 31 is positioned in radially outward coplanar relation with the bearing 38, and thus does not impose side loading forces on the bearing 38. The rotary actuator 51 transmits rotational force through the engagement of the abutment surfaces 81, 82 on brake disc 81 with the abutment surfaces 86, 87 of the abutment 84 on the tree harvester head structure 32. This abutment connection can only transmit torque, thus insuring that the rotary actuator 51 is not subjected to external radial or axial loading.

The spring applied and pressure released brake 89 between the mounting structure 23 and the tree harvester head structure 32 prevents rotational movement of the tree harvester head structure 32 when the rotary actuator 51 is not operated and is automatically released when the rotary actuator is operated. The brake 89 prevents undesired rotational movement of the tree harvesting head structure 32 which might otherwise occur if, for instance, some pressure fluid leakage should occur at the vanes 57, 58 of the rotary actuator 51.

The vanes 57, 58 of the rotary actuator 51 are sufficiently small in their circumferential dimension to permit the tree harvester head structure 32 to be rotated up to 150 degrees in each lateral direction from its vertical position, thus providing operational advantages over prior commercial designs having substantially less pivoting capability, such as 110 degrees of rotation in each lateral direction.

The various parts of the coupling 31 are easily assembled and are relatively easy to disassemble should such action become necessary to replace components subject to wear. The coupling of this invention is light in weight, compared to prior coupling designs thus maximizing payload capacity. The apparatus heretofore known, or commercially available, for mounting and rotating the felling head of a tree harvester have been very heavy, expensive and excessively exposed to damage and wear. The support bearing and rotary actuator of the present invention is very compact, with minimal exposure of working parts to the debris encountered in tree harvesting operations.

Other aspects, objects and advantages of this invention can be obtained from a study of the drawings, the disclosure and the appended claims.

What is claimed is:

1. A coupling for connecting a tree harvester head structure to a mounting structure, comprising:
    a bearing capable of carrying axial and radial load supporting said tree harvester head structure on said mounting structure for rotation about a bearing axis including
        a radially outer member rigidly secured to one of said mounting and head structures and
        a radially inner member rigidly secured to the other of said mounting and head structures and
    an annular fluid powered rotary actuator disposed on one of the radially inner and outer sides of said bearing including an annular housing component including walls defining an annular groove and a vane forming a dam in said groove and an annular reaction component in fluid sealing engagement with said walls of said housing component including a vane extending radially into said groove, said vanes being circumferentially spaced from one another to divide said groove into two pressure chambers, said vanes having circumferential thicknesses sufficiently small to permit in excess of 220 degrees relative rotation between said housing component and said reaction component, one of said housing and reaction components of said rotary actuator being rigidly secured to said mounting structure and the other of said housing and reaction components being connected for rotation with said head structures.

2. The coupling of claim 1 wherein said rotary actuator and said bearing are substantially coplanar.

3. The coupling of claim 2 wherein said rotary actuator encircles said bearing.

4. The coupling of claim 3 wherein said annular groove opens radially inward.

5. The coupling of claim 4 wherein said other of said housing and reaction components and said head structure have circumferentially confronting abutment surfaces preventing relative rotation and permitting relative radial movement between said other of said housing and reaction components and said head structure.

6. The coupling of claim 5 wherein one of said vanes contains separate fluid passages opening, respectively, into said pressure chambers.

7. The coupling of claim 6 wherein said one of said vanes is said vane of said housing component.

8. The coupling of claim 7 wherein said radially inner member of said bearing is rigidly secured to said mounting structure.

9. The coupling of claim 1 wherein said rotary actuator is on the radially outer side of said bearing.

10. The coupling of claim 9 wherein said annular groove opens radially inward.

11. The coupling of claim 10 wherein said vane in said housing component contains separate fluid passages connected, respectively, to said pressure chambers.

12. The coupling of claim 1 including a spring applied and fluid pressure released brake between said mounting structure and said tree harvester head structure.

13. The coupling of claim 12 including a fluid control system for operating said rotary actuator and said brake wherein said brake is released automatically when said rotary actuator is operated.

14. A tree harvester having a mounting structure and a tree harvester head structure, the tree harvester comprising:

a coupling for connecting said tree harvester head structure to said mounting structure including
an anti-friction bearing capable of carrying axial and radial load supporting said tree harvester head structure on said mounting structure for rotation about a bearing axis including
a radially outer race rigidly secured to one of said mounting and head structures;
a radially inner race rigidly secured to the other of said mounting and head structures; and
anti-friction bodies between said races; and
an annular fluid powered rotary actuator disposed on one of the radially inner and outer sides of said bearing including an annular housing component including walls defining an annular groove and a vane forming a dam in said groove; and an annular reaction component in fluid sealing engagement with said walls of said housing component including a vane extending radially into said groove;

said vanes being circumferentially spaced from one another to divide said groove into two pressure chambers, said vanes having circumferential thicknesses sufficiently small to permit over 220 degrees of relative rotation between said housing component and said reaction component;

one of said housing and reaction components of said rotary actuator being rigidly secured to one of said mounting and head structures and the other of said housing and reaction components being connected for rotation with the other of said mounting and head structures.

15. The tree harvester of claim 14 wherein said rotary actuator is disposed radially outward of said bearing.

16. The tree harvester of claim 14 wherein said annular groove opens radially inward.

17. The tree harvester of claim 14 wherein said rotary actuator said head structure have circumferentially confronting abutment surfaces preventing relative rotation and permitting relative radial movement.

18. The tree harvester of claim 14 including a spring applied and fluid pressure released brake between said mounting structure and said tree harvester head structure wherein said brake is automatically applied to prevent relative rotation between said structures when said rotary actuator is not operated and is automatically released to permit relative rotation of said structures when said rotary actuator is operated.

19. The tree harvester of claim 18 wherein said brake includes a brake disc secured to said housing component of said rotary actuator.

20. A method of operating a tree harvester of the type having a mounting structure on a self propelled machine and a tree harvester head structure, said method comprising the steps of:

constructing a coupling between said mounting structure and said tree harvester head structure by
providing a large diameter antifriction bearing capable of carrying radial load and axial load between said structures;
positioning an annular fluid operated rotary actuator with housing and reaction components in encompassing coplanar relation to said bearing; and
connecting one of said housing and reaction components to said support structure and
connecting the other of said housing and reaction components to said tree harvester head structure;

installing a spring applied and fluid pressure released brake between said structures and providing a fluid control system for said fluid pressure operated actuator and said spring applied and fluid pressure released brake permitting automatic application of said brake when said rotary actuator is not operated and automatically releasing said brake when said rotary actuator is operated.

* * * * *